H. A. VAHE.
RELEASE RIGGING FOR COUPLINGS.
APPLICATION FILED JULY 26, 1920.
1,414,606.
Patented May 2, 1922.
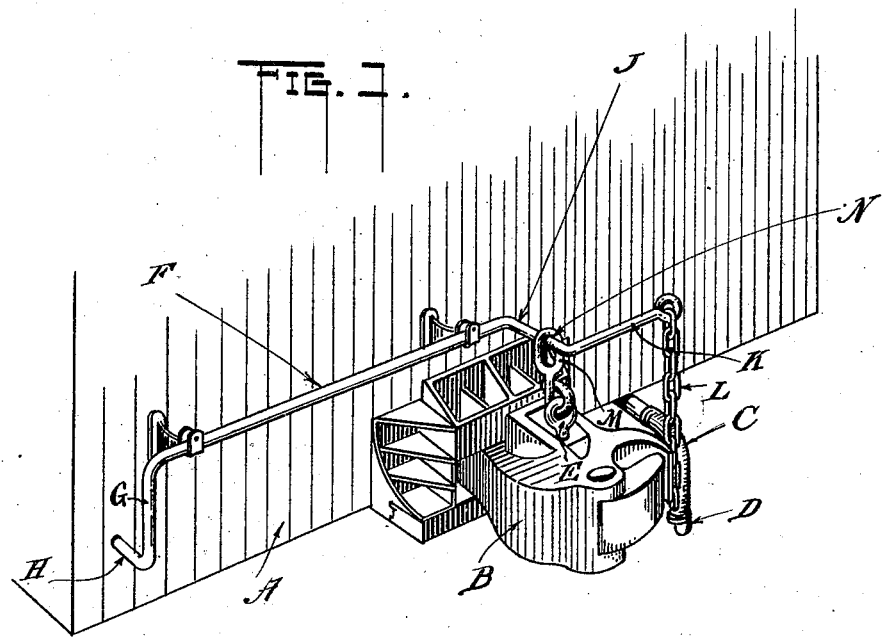
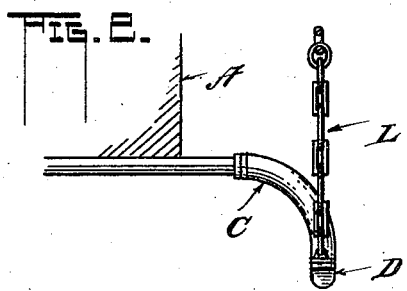
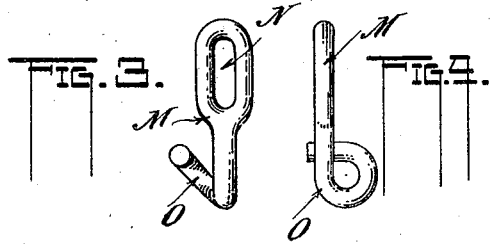
Inventor
Hector A. Vahe,
By L. M. Thurlow
Attorney

UNITED STATES PATENT OFFICE.

HECTOR ALEXANDER VAHE, OF DECATUR, ILLINOIS.

RELEASE RIGGING FOR COUPLINGS.

1,414,606.   Specification of Letters Patent.   Patented May 2, 1922.

Application filed July 26, 1920. Serial No. 399,169.

*To all whom it may concern:*

Be it known that I, HECTOR A. VAHE, a citizen of the United States, residing at Decatur, in the county of Macon and State of Illinois, have invented certain new and useful Improvements in Release Rigging for Couplings; and I do hereby declare that the following is a full, clear, and exact description of the invention, which will enable others skilled in the art to which it appertains to make and use the same.

This invention relates to a release rigging for the couplings of cars and for the couplings of the air hose of said cars, said invention also being directed to a so-called release-clevis for operating the coupling pin.

An object of the invention is to provide a release mechanism having control of the coupling of the car and of the air hose by which the two couplings may be operated simultaneously, or substantially so, to the end that the hose may not be pulled apart when the cars separate.

Another object is the provision of a release-clevis for car couplings that will be thoroughly reliable and that will not become disconnected in use.

To the end that by invention may be understood, I have provided the accompanying drawing wherein—

Figure 1 shows the end of a car in perspective with my invention mounted thereon.

Figure 2 is a side elevation of an air hose connection, and

Figures 3 and 4 are front and side elevations, respectively, of a clevis.

When the need of uncoupling and dropping a car from a train or cut of cars presents itself, difficulties at once arise in that when the connecting coupling of two cars is released there is great danger of pulling the air hose apart if it has not been disconnected.

For example, if the cars happen to be in movement during the act of uncoupling, there is danger that the air hose will be broken as the cars separate unless said hose can be uncoupled practically simultaneously with the release of the car coupling.

Again, it often occurs that since uncoupling of the cars and the air hose connections are separate operations the attendant will lose sight of the hose connection in his strict attention to the main coupling, resulting in the pulling asunder of the hose, when the standing cars are eventually separated.

In view of these facts it is my purpose to provide a simple mechanism that will accomplish the simultaneous uncoupling of the cars and the air hose to the end that expense and delays will be avoided because of the considerable breakage occurring in hose connections in general from the cause stated.

In addition, it is my purpose to produce a special form of release-clevis for operating the coupling pin, such clevis being constructed in such a way that it and the pin can be manually disengaged and yet in use cannot become inadvertently separated.

In the drawing, A indicates the car, B a coupling extending therefrom, and C an air hose having any usual half-coupling indicated at D for connection with a similar half-coupling (not shown), of another car, and E indicates the coupling pin.

F is a rock-shaft suitably journaled on the car bent at its end near one side of the car to constitute a hand lever G, limited in movement in one direction by a bent extension H, for example, resting against the car-end whereby to limit the rocking-movement of the shaft, though it is to be understood that other means for limiting such rocking movement may be adopted.

At its other end the shaft is bent substantially at right angles into an arm J which preferably lies normally in substantially a horizontal position above the center longitudinal line of the coupling B and just above the locking pin E, said arm being then extended parallel to the said shaft into a portion K.

L is a flexible member such as a chain, for example, connecting the usual lever, not shown, of the hose coupling D with the extended portion K of the shaft F, and M is a clevis consisting of a single member having in one end an eye elongated vertically as shown at N, said clevis being suspended from the arm J of the shaft F as shown.

The opposite end of the clevis is bent into a hook O in the form of an open eye, the extremity of the hook as viewed in Fig. 4 extending past the shank of the clevis but spaced therefrom as seen in Fig. 3, by which means the said hook can be inserted into the eye of the coupling pin with little chance of separation of the two taking place in use, the hook being in the nature of a part of a spiral.

When the coupling pin E is in place in the coupling the clevis is suspended in a vertical position from the arm J as in Fig. 1, the extension H of the lever sustaining said clevis in that position, the chain L attached to the hose coupling having such a length and so arranged that when the shaft F is rocked to lift the pin E for releasing the coupling the chain will simultaneously separate the hose coupling from its companion.

The slot N in the clevis gives the latter free play upon the arm J and also permits it to be swung upon said arm manually when separating or connecting it and the release pin.

It is to be seen that my clevis by its peculiar form, and without any change therein, can be readily attached and detached from the arm J and pin E and yet that form is such that no possible jarring in use or change in the relation it bears to the pin can cause its disengagement from the latter especially since it is never permitted to drop down to a position to allow disengagement, the extension H of the lever always maintaining the clevis upright.

Slight changes may be made in my release rigging as may suggest themselves, though the form shown is found to yield excellent results in practice.

I claim:

In a release rigging for couplings, the combination with a car, its coupler-head and locking pin, and an air hose and its coupler-head, of a member on the car comprising a shaft portion including an arm at one end forming a limiting stop for the shaft in one direction of its rotation, and also including an arm extending to and overhanging the first named coupler-head, said arm being extended laterally beyond the latter substantially parallel to the shaft portion and offset from the axis thereof, means flexibly attached to the second named arm and connected to the locking pin, and a second flexible member attached to the extended portion of the said second named arm and connected to the coupler-head of said air hose.

In testimony whereof I affix my signature in presence of two witnesses.

HECTOR ALEXANDER VAHE.

Witnesses:
W. O'BRIEN,
S. S. PINKNEY.